United States Patent [19]
McLaughlin

[11] Patent Number: 5,348,121
[45] Date of Patent: Sep. 20, 1994

[54] ENGINE PRE-OILER

[76] Inventor: Norman L. McLaughlin, 106 Bellevue Blvd. N., Bellevue, Nebr. 68005

[21] Appl. No.: 106,537

[22] Filed: Aug. 16, 1993

Related U.S. Application Data

[63] Continuation-in-part of Ser. No. 871,937, Apr. 21, 1992, Pat. No. 5,244,059.

[51] Int. Cl.$^5$ .......................... F01M 9/00; F01M 1/00
[52] U.S. Cl. ..................................... 184/6.3; 184/29; 184/55.1; 123/196 R
[58] Field of Search ................... 184/6.3, 29, 39, 55.1, 184/108; 123/196 R

[56] References Cited

U.S. PATENT DOCUMENTS

| | | | |
|---|---|---|---|
| 2,413,069 | 12/1946 | Reagan | 184/6.3 |
| 2,747,564 | 5/1956 | Wehling | 184/6.3 |
| 2,755,787 | 7/1956 | Butler et al. | 184/6.3 |
| 2,838,039 | 6/1958 | Smith et al. | 184/6.3 |
| 3,422,807 | 1/1969 | Waldecker | 123/196 |
| 3,556,070 | 12/1971 | Holcomb | 123/196 |
| 3,583,525 | 6/1971 | Holcomb | 184/6.3 |
| 3,722,623 | 3/1973 | Waldecker | 184/6.3 |
| 4,094,293 | 6/1978 | Evans | 123/196 S |
| 4,199,950 | 4/1980 | Hankanson et al. | 184/6.3 |
| 4,513,704 | 4/1985 | Evans | 123/196 S |
| 4,893,598 | 1/1990 | Stasivk | 123/196 R |
| 5,012,897 | 5/1991 | Jorissen | 184/39 |
| 5,156,120 | 10/1992 | Kent | 184/6.3 |
| 5,197,424 | 3/1993 | Blum | 184/6.3 |

FOREIGN PATENT DOCUMENTS

| | | | |
|---|---|---|---|
| 3804755 | 8/1989 | Fed. Rep. of Germany | 184/6.3 |
| 3100312 | 4/1991 | Japan | 184/6.3 |
| 0585306 | 12/1977 | U.S.S.R. | 184/6.3 |
| 1574848 | 6/1990 | U.S.S.R. | 184/6.3 |

*Primary Examiner*—Thomas E. Denion
*Attorney, Agent, or Firm*—Zarley, McKee, Thomte, Voorhees & Sease

[57] ABSTRACT

A pre-oiler assembly includes a hollow body portion with a hollow float body assembly secured to the lower end thereof. A solenoid operated three-way air valve has one port communicating with the interior of the hollow body, a second port connected to a source of air pressure, and a third port connected to the engine to vent air from the hollow body into the engine. The deactivated position of the air valve connects the first and third ports so as to vent air from an oil chamber within the hollow body, to the engine. The activated position of the air valve connects the first and second ports, such that air under pressure enters the oil chamber to force oil from the hollow body. The float body assembly at the lower end of the hollow body portion has an oil line extending therefrom to the engine to be pre-oiled. A normally closed solenoid operated oil valve is interposed in the oil line, and permits oil passage through the oil line to the engine when activated to the open position. An oil inlet connecting the oil chamber to a source of oil includes a one-way check valve to prevent back flow from the oil chamber. A key switch is provided for actuating the solenoids when it is desired to pre-oil the engine.

6 Claims, 4 Drawing Sheets

ENGINE PRE-OILER

CROSS-REFERENCE TO RELATED APPLICATION

This is a continuation-in-part application of Ser. No. 07/871,937 filed Apr. 21, 1992 now U.S. Pat. No. 5,233,059.

TECHNICAL FIELD

This invention relates to an engine pre-oiler and more particularly to an improved engine pre-oiler.

BACKGROUND OF THE INVENTION

Many types of engine pre-oilers have been previously provided in an attempt to pre-oil certain moving parts of an engine prior to the engine being adequately oiled or lubricated by the engine lubrication system. The prior art devices suffer from many disadvantages. One disadvantage of certain prior art engine pre-oilers is that they do not adequately lubricate the engine. Yet another disadvantage of the prior art pre-oilers is that they are extremely complicated and cumbersome. Still another disadvantage of the prior art pre-oilers is that they do not have sufficient safeties associated therewith to prevent damage to the engine should the pre-oiler improperly function. Yet another disadvantage of the prior art pre-oilers is that they are extremely costly.

SUMMARY OF THE INVENTION

It is therefore a principal object of the invention to provide an improved engine pre-oiler.

A further object of the invention is to provide an engine pre-oiler which provides sufficient lubrication to the engine.

Still another object of the invention is to provide an engine pre-oiler which utilizes air pressure to force oil to moving parts of the engine prior to the engine being started.

Still another object of the invention is to provide an engine pre-oiler which includes safeties associated therewith to prevent damage to the engine should the pre-oiler fail for some unexplained reason.

Still another object of the invention is to provide an engine pre-oiler which is relatively simple and which may be installed on existing trucks.

Another object of this pre-oiler is to provide warm oil to the engine prior to cranking to aid in cold weather start-up.

Yet another object of the invention is to provide an engine pre-oiler which is economical of manufacture and durable in use.

These and other objects will be apparent to those skilled in the art.

The pre-oiler assembly of the present invention includes a hollow body portion with a hollow float body assembly secured to the lower end thereof. A solenoid operated three-way air valve has one port communicating with the interior of the hollow body, a second port connected to a source of air pressure, and a third port connected to the engine to vent air from the hollow body into the engine. The deactivated position of the air valve connects the first and third ports so as to vent air from an oil chamber within the hollow body, to the engine. The activated position of the air valve connects the first and second ports, such that air under pressure enters the oil chamber to force oil from the hollow body. The float body assembly at the lower end of the hollow body portion has an oil line extending therefrom to the engine to be pre-oiled. A normally closed solenoid operated oil valve is interposed in the oil line, and permits oil passage through the oil line to the engine when activated to the open position. An oil inlet connecting the oil chamber to a source of oil includes a one-way check valve to prevent back flow from the oil chamber. A float switch is mounted within the float body assembly and is series connected to the air and oil valve solenoids. The float switch deactivates the solenoids of the air and oil valves when oil in the float body assembly drops below a predetermined level. A key switch is provided for actuating the solenoids when it is desired to pre-oil the engine.

DESCRIPTION OF THE PREFERRED EMBODIMENT

Figure 1:
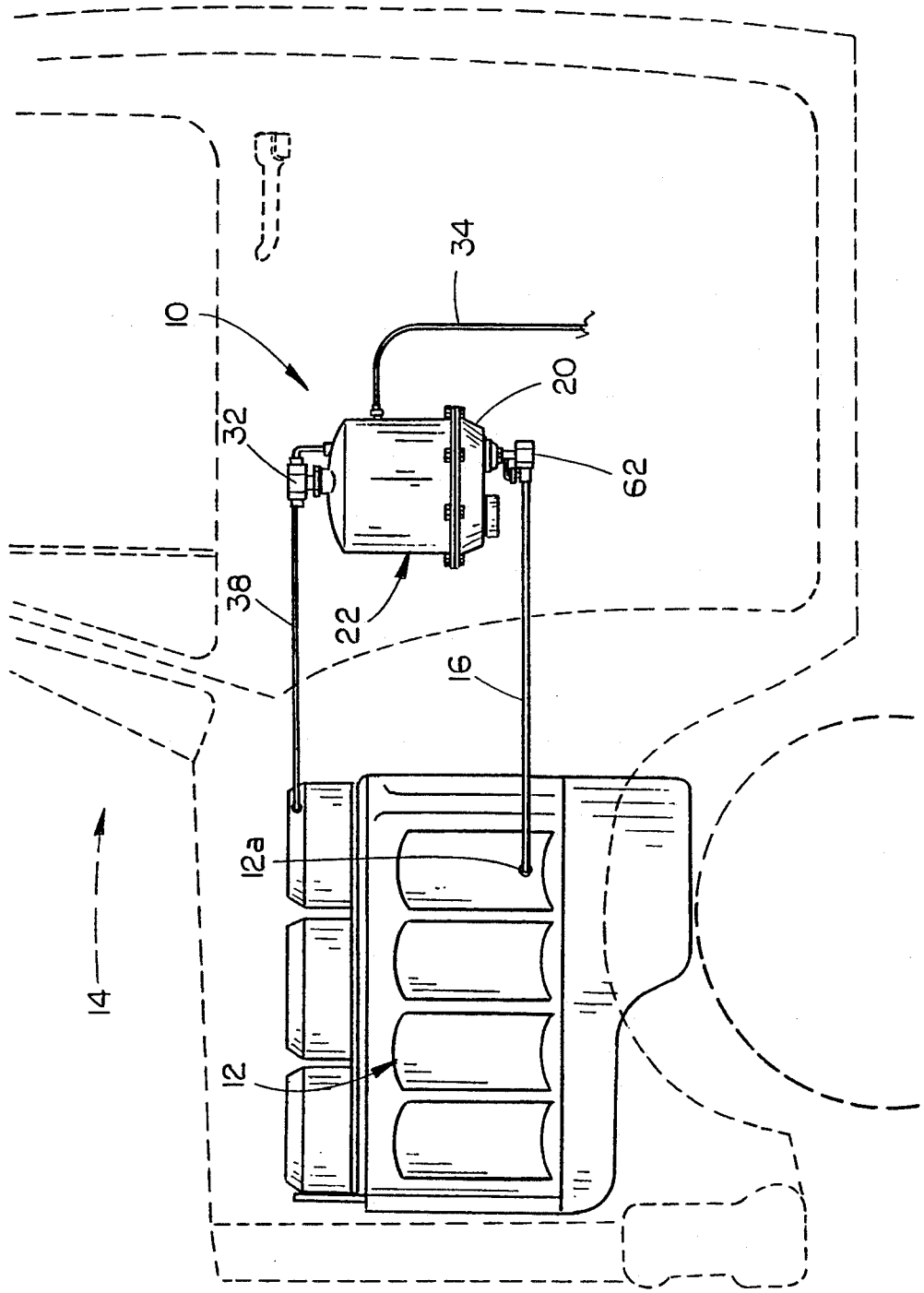
FIG. 1 is a schematic of the pre-oiler of this invention and its association with respect to a truck engine.
Figure 2:
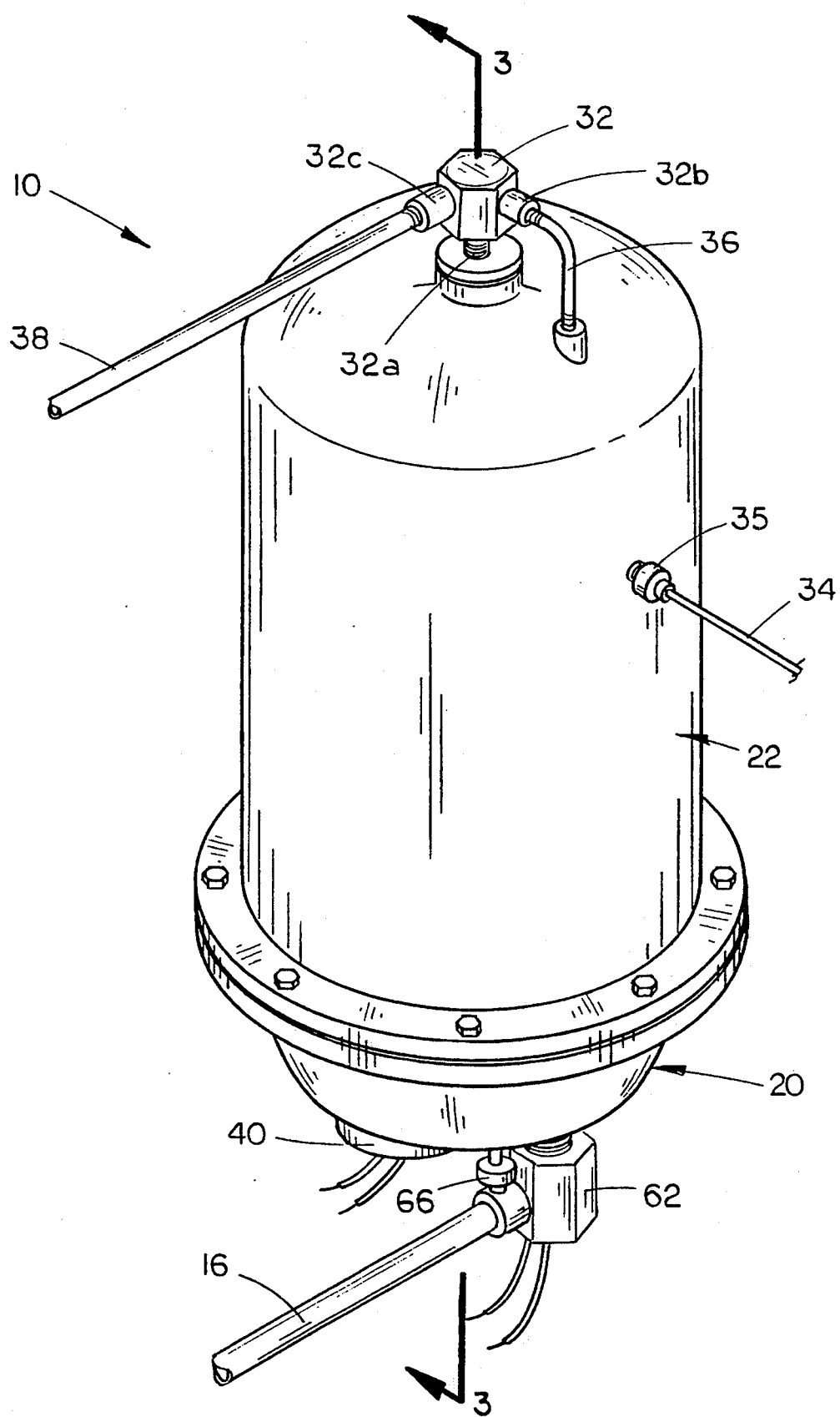
FIG. 2 is a perspective view of the pre-oiler of this invention.

Referring now to the drawings, and more particularly to FIG. 1, the engine pre-oiler of this invention is referred to generally by the reference numeral 10 and is designed to pre-lubricate a diesel engine 12 or the like utilized on a truck 14 or the like. The diesel engine 12 provides a source of oil under pressure for the pre-oiler. The source is referred to generally by the reference numeral 12a, from which extends oil line 16. Oil line 16 serves both to provide lubrication to the engine, and to supply oil to pre-oiler 10. The engine pre-oiler 10 is located on the truck in any convenient location and is controlled by a key switch 18 which may be incorporated into the ignition switch of the truck if so desired.

Figure 3:
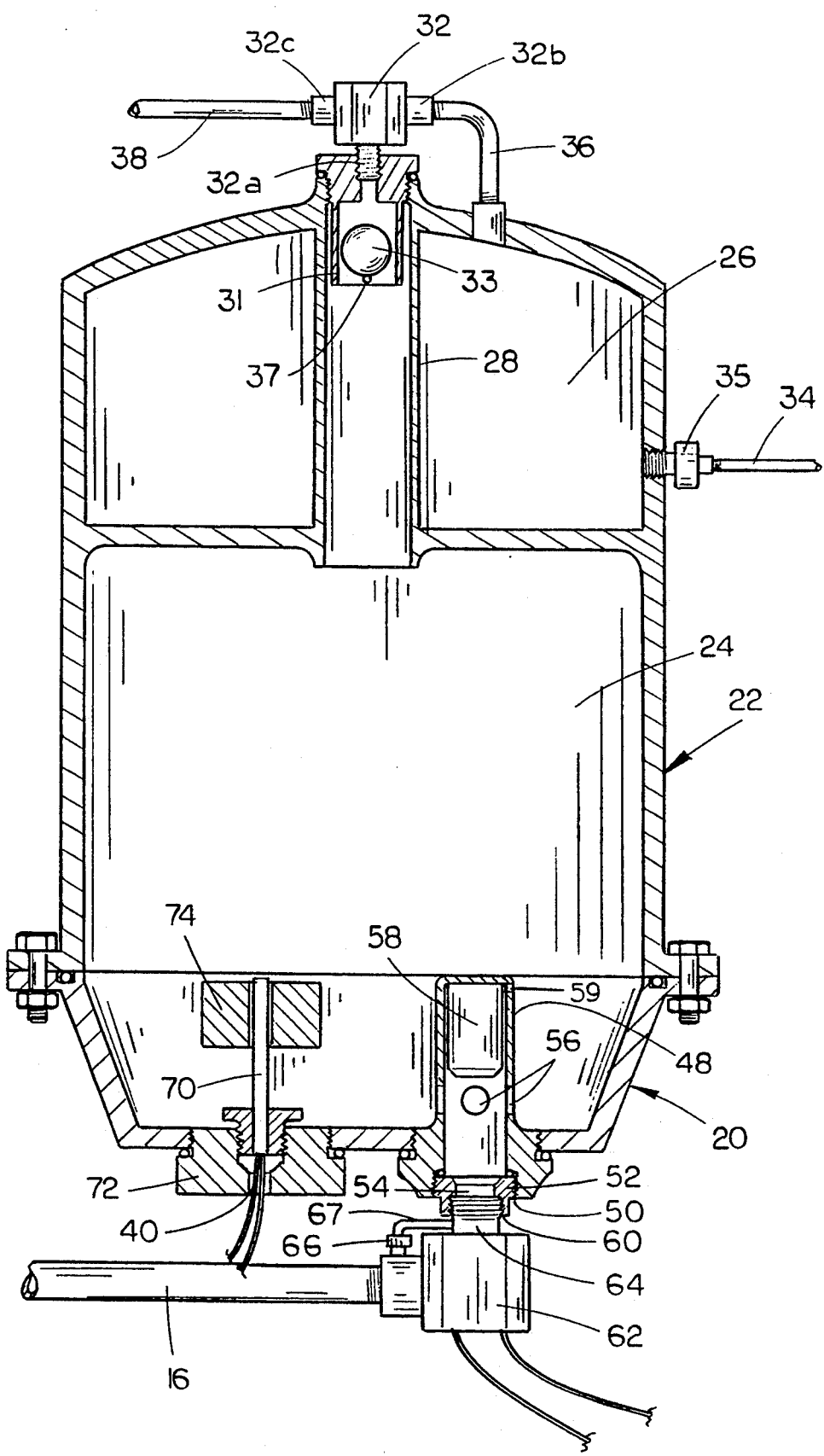
FIG. 3 is a sectional view as seen on lines 3—3 of FIG. 1.

Pre-oiler 10 includes a float body assembly 20 which is bolted or otherwise secured to the lower end of a body portion 22 as seen in FIG. 3. Body portion 22 includes an oil chamber 24, which opens downwardly into float assembly 20, and an air-tight air chamber 26 formed in the upper end thereof. A tube 28 extends from oil chamber 24 upwardly through air chamber 26 to the upper end of body portion 22. Tube 28 serves to vent air from oil chamber 24, and to provide air pressure thereto, as described hereinbelow.

A three-way solenoid 32 is positioned on the upper end of tube 28 and has a first port 32a in communication with the interior thereof. An air line 36 extends from a second port 32b of solenoid 32 and is connected to the air chamber 26 of body portion 22. An air line 34 extends from a conventional source of air pressure 37 on the truck, and is connected through a one-way check valve 35 to air chamber 26, to provide air pressure of about 120 psi. Solenoid 32 is normally deactivated, blocking port 32b to prevent the flow of air under pressure from air chamber 26 into the interior of oil chamber 24.

A vent line 38 is in communication with third port 32c in solenoid 32, and is in communication with port 32a while solenoid 32 is deactivated, to permit the venting of air from the interior of air valve assembly 24 to the crankcase as the pre-oiler is being refilled with oil. Solenoid 32 is conventionally designed to prevent the passage of air through third port 32c when air is being supplied to the pre-oiler through line 36, when the solenoid is in the "activated" position.

Port 32a is provided with a downwardly projecting tube 31 having a float ball 33 operably retained therein with a retaining pin 37. Float ball 33 has a diameter less than that of tube 31, to permit the venting of air around the ball 33 and through port 32c. However, float ball 33 is designed to engage and plug port 32c when the level of oil within tube 28 rises into tube 31.

Figure 4:
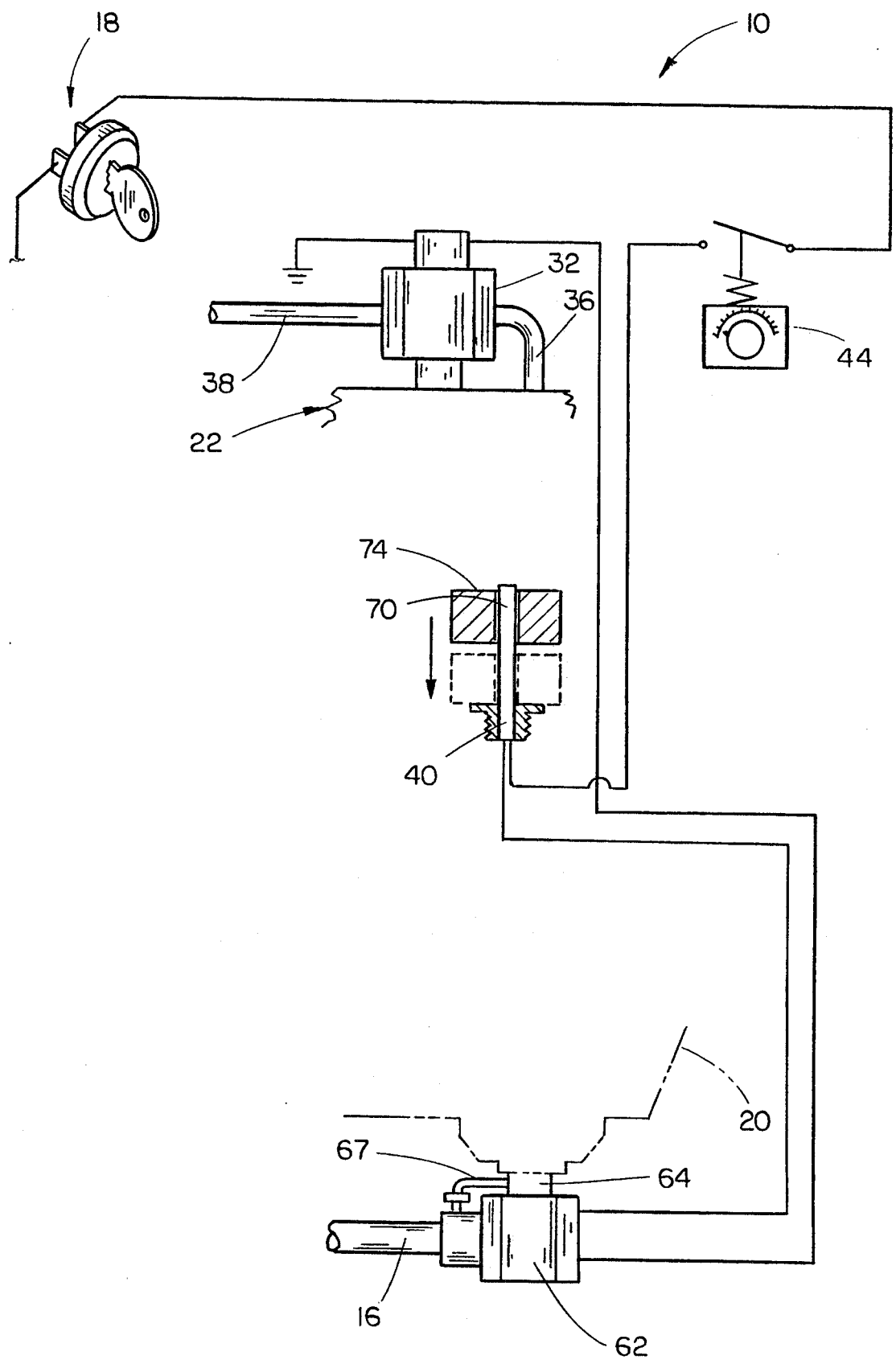
FIG. 4 is a schematic of the circuitry of the invention.

Solenoid 32 is electrically series connected to switch 40 which is electrically series connected to timer switch 44 as seen in FIG. 4. Timer switch 44 is electrically series connected to key switch 18.

Referring again to FIG. 3, a float tube 48 is removably secured to and extends upwardly through the lower end of float body assembly 20. Float tube 48 is provided with an internally threaded portion 50 which threadably receives valve seat 52 having opening 54 formed therein. Valve seat 52 includes an internally threaded portion 60 at its lower end, which receives the upper end of a connector 64 therein.

Float tube 48 is provided with a plurality of openings 56 formed therein which are positioned above valve seat 52. A bullet-shaped float 58 is floatably mounted in float tube 48 above valve seat 52 and has a lower end portion adapted to seat upon and seal opening 54 when the oil within float body assembly 20 drops to a predetermined level. Float tube 48 is closed at its upper end to retain float 58 therein. A vent aperture 59 is formed in the upper end of float tube 48 to permit float 58 to move in the upper end of float tube 48.

Connector 64 connects a two-way normally closed solenoid 62 with the lower end of float tube 48 to permit oil to pass through line 16 when the solenoid 62 is opened. A one-way check valve 66 permits oil to flow from line 16 to connector 64 and into the lower end of float tube 48 when solenoid 62 is in the normally closed position.

A conventional magnetically activated electrical switch 40 is mounted within an upstanding tube 70 removably mounted to a base 72 which is threaded into an aperture in the lower end of float body assembly 20. An annular float 74 is journaled on tube 70, and has a magnet therein which will activate the switch 40 within tube 70 when float 74 reaches the upper end of tube 70, to close an electrical circuit.

While the engine is operating, the oil chamber 24 fills by means of oil being supplied under pressure from the source 12a through the line 16, check valve 66 and is then delivered upwardly through the float tube 48. The oil flows outwardly through the openings 56 into the float body assembly 20, and then upwardly to fill oil chamber 24. As oil chamber 24 fills, air valve 32 will be in the deactivated position such that the air in the chamber will be vented outwardly through the line 38. Vent line 38 is in communication with the crankcase, rather than the atmosphere, so that the oil being delivered to the pre-oiler will not drain outwardly of the system but will drain back into the crankcase as a safety measure.

When the engine is shut down, oil will remain in the pre-lube oil chamber 24 ready for use.

Before the engine is again started, key 18 will be turned to "run" position, which will activate timer 44 to close the circuit to both the air solenoid 32 and the oil solenoid 62 for approximately thirty seconds, or any desired timer setting. The actuation of solenoid 32 to the activated position closes port 32c and opens port 32b so that air under pressure from air chamber 26 is provided to the system (as shown in FIG. 3). It is preferred that approximately 120 psi pressure be used although the same could be regulated down to a lower pressure if required. As solenoid 32 is opened, and air under pressure is released into oil chamber 24, the oil in the oil chamber 24 will be forced outwardly through solenoid 62 (which is also opened via timer 44) and oil line 16, and into the engine where it will lubricate those parts requiring lubrication.

The pre-oil cycle will stop when float 74 moves downwardly to deactivate the switch within tube 70, or at the end of the timer cycle. When switch 40 is opened, solenoids 32 and 62 are deactivated. With solenoid 32 in the deactivated position solenoid 32 will close port 32b and open port 32c to vent the air chamber. Closing of the solenoid 62 halts the flow of oil from the pre-oiler to the engine. Once the engine is started, the oil chamber will refill through the check valve 66 as described above. It is desired that oil fill line 67 be such a small diameter that the oil chamber will be slowly filled to prevent oil starvation during the refill process. When the oil chamber is refilled, the system will be ready for the next pre-oil or pre-lube cycle.

The pre-oiler of this invention utilizes the air system of the vehicle as a power source. Air could also be provided with a DC air compressor if so desired. By utilizing the air pressure of the vehicle as a power source, high oil pressure is provided in the pre-oiling cycle as well as high oil volume to the engine prior to start-up. Further, since the system is o being pre-oiled by air pressure, excess battery drain is prevented during the pre-oil cycle. Similarly, since air chamber 26 is continuously pressurized, air pressure is readily available to the pre-oiler, regardless of the state of the air pressure system of the vehicle.

Thus it can be seen that the invention accomplishes at least all its stated objectives.

I claim:

1. A pre-oiler assembly for pre-oiling an engine, comprising, a hollow body portion having upper and lower ends;

a hollow float body assembly secured to the lower end of said hollow body portion and having upper and lower ends;

an operable air valve having first, second and third ports, secured to said body portion adjacent the upper end thereof, said air valve operable between an activated position wherein the first and third ports are open to permit fluid flow and the second port is closed, and a deactivated position wherein the first and second ports are open to permit fluid flow and the third port is closed;

said hollow body portion and said hollow float body assembly having a fluidly connected interior forming an oil chamber;

an upper interior of said oil chamber being in fluid communication with said air valve first port;

said air valve third port being in communication with a source of air under pressure, said float body assembly having an oil line extending therefrom to the engine being pre-oiled;

an operable oil valve imposed in said oil line and operable between open and closed positions;

means for operating the oil valve to the open position when the air valve is in the activated position, and for operating the oil valve to the closed position when the air valve is in the deactivated position;

said float body assembly having an oil inlet in communication with the interior thereof;

said oil inlet being in communication with a source of oil under pressure within the engine;

a float switch means in said float body assembly which is connected to the air valve and operable to operate the air valve to the deactivated position when the oil in said oil chamber drops to a predetermined level;

and control means for actuating the air valve to the activated position when it is desired to pre-oil the engine.

2. The pre-oiler assembly of claim 1 wherein oil inlet provides a restricted flow so that the engine will not be oil starved as said pre-oiler is in a refill cycle after a pre-oiling cycle.

3. The pre-oiler assembly of claim 1 wherein a check valve means is provided in said oil inlet to prevent oil from flowing outwardly from said oil inlet.

4. The pre-oiler assembly of claim 1 wherein said control means includes a timer means for activating the air valve to the activated position for a predetermined period of time.

5. The pre-oiler assembly of claim 1, further comprising an air chamber interposed between said source of air under pressure and said air valve third port, for storing air under pressure for use in operating said pre-oiler assembly, and including a one-way check valve interposed between said air chamber and air source operable to prevent back flow of air from the air chamber to the air source.

6. The pre-oiler assembly of claim 5, wherein said air chamber is formed within the interior of said hollow body portion.

* * * * *